United States Patent
Demircan et al.

(10) Patent No.: US 9,245,086 B2
(45) Date of Patent: Jan. 26, 2016

(54) TECHNIQUES FOR ELECTROMIGRATION STRESS MITIGATION IN INTERCONNECTS OF AN INTEGRATED CIRCUIT DESIGN

(71) Applicants: Ertugrul Demircan, Austin, TX (US); Mehul D. Shroff, Austin, TX (US)

(72) Inventors: Ertugrul Demircan, Austin, TX (US); Mehul D. Shroff, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 78 days.

(21) Appl. No.: 14/266,499

(22) Filed: Apr. 30, 2014

(65) Prior Publication Data

US 2015/0046893 A1 Feb. 12, 2015

Related U.S. Application Data

(63) Continuation-in-part of application No. 13/964,344, filed on Aug. 12, 2013, now Pat. No. 8,793,632.

(51) Int. Cl.
*G06F 17/50* (2006.01)

(52) U.S. Cl.
CPC ........ *G06F 17/5081* (2013.01); *G06F 17/5036* (2013.01); *G06F 17/5068* (2013.01); *G06F 17/5077* (2013.01); *G06F 2217/82* (2013.01)

(58) Field of Classification Search
CPC ............ G06F 17/5068; G06F 17/5077; G06F 17/5081
USPC .................. 716/110–112, 126, 130
See application file for complete search history.

(56) References Cited

U.S. PATENT DOCUMENTS

| | | | |
|---|---|---|---|
| 5,379,231 A | 1/1995 | Pillage | |
| 5,900,735 A * | 5/1999 | Yamamoto | ......... G01R 31/2853 |
| | | | 257/758 |
| 6,714,037 B1 * | 3/2004 | Hau-Riege | ............. G01R 27/26 |
| | | | 324/750.03 |
| 6,789,237 B1 | 9/2004 | Ismail | |
| 7,318,207 B2 | 1/2008 | Takabe | |
| 7,451,411 B2 | 11/2008 | Hau-Riege | |
| 8,524,557 B1 | 9/2013 | Hall | |
| 2011/0173583 A1 | 7/2011 | Barwin et al. | |

OTHER PUBLICATIONS

Lienig, J., "Invited Talk: Introduction to Electromigration-Aware Physical Design," 2006, ACM 1-5593-299, Feb. 6, 2004, pp. 39-46.
U.S. Appl. No. 13/484,328, Notice of Allowance dated Jun. 11, 2013.
Black, J. R., "Mass transport of Al by momentum exchange with conduction electrons," Proc. IEEE Int. Rel. Phys. Symp., 1967, pp. 148-159.

(Continued)

*Primary Examiner* — Stacy Whitmore
(74) *Attorney, Agent, or Firm* — Yudell Isidore PLLC

(57) ABSTRACT

A technique for electromigration stress mitigation in interconnects of an integrated circuit design includes generating a maximal spanning tree of a directed graph, which represents an interconnect network of an integrated circuit design. A first point on the spanning tree having a lowest stress and a second point on the spanning tree having a highest stress are located. A maximum first stress between the first and second points is determined. In response to determining the maximum first stress between the first and second points is greater than a critical stress, a stub is added to the spanning tree at a node between the first and second points. The maximum first stress between the first and second points is re-determined subsequent to adding the stub.

20 Claims, 6 Drawing Sheets

(56) References Cited

OTHER PUBLICATIONS

M. Gall, et. al., "Chip-Level Electromigration Reliability for Cu Interconnects," AIP Conference Proceedings, vol. 741, 2004.
I. A. Blech, "Electromigration in thin aluminum films on titanium nitride," J. Appl. Phys., vol. 47, No. 4, pp. 1203-1208, 1976.
H. Haznedar, M. Gall, V. Zolotov, P. S. Ku, C. Oh, R. Panda, "Impact of Stress-Induced Backflow on Full-Chip Electromigration Risk Assessment," IEEE Trans. On Comp. Aided Design, vol. 25, No. 6, pp. 1038-1046.

* cited by examiner

TECHNIQUES FOR ELECTROMIGRATION STRESS MITIGATION IN INTERCONNECTS OF AN INTEGRATED CIRCUIT DESIGN

This application is a continuation-in-part of U.S. patent application Ser. No. 13/964,344, entitled "TECHNIQUES FOR ELECTROMIGRATION STRESS DETERMINATION IN INTERCONNECTS OF AN INTEGRATED CIRCUIT," filed Aug. 12, 2013, which is a continuation-in-part of U.S. patent application Ser. No. 13/484,328 (now U.S. Pat. No. 8,510,695), entitled "TECHNIQUES FOR ELECTROMIGRATION STRESS DETERMINATION IN INTERCONNECTS OF AN INTEGRATED CIRCUIT," filed May 31, 2012. The disclosure of U.S. patent application Ser. No. 13/964,344 is incorporated herein by reference in its entirety for all purposes.

BACKGROUND

1. Field

This disclosure relates generally to an integrated circuit design and, more specifically, to techniques for electromigration stress mitigation in interconnects of an integrated circuit design.

2. Related Art

Electromigration (EM) refers to the transport of material that is caused by gradual movement of ions in a conductor due to momentum transfer between conducting electrons and diffusing metal atoms. In general, EM should be considered in applications where relatively high direct current densities are expected, such as in microelectronics and related structures. As structure sizes in integrated circuits (ICs) decrease, the practical significance of EM increases. EM first became of practical interest in the electronics field when the first ICs became commercially available. EM research in the IC field began at a time when metal interconnects in ICs were about 10 micrometers wide. Currently, IC interconnects are hundreds to tens of nanometers in width. EM decreases the reliability of ICs (chips) and can cause the eventual loss of connections or failure of a circuit.

Although EM damage ultimately results in failure of an affected IC, initial symptoms may include intermittent glitches that are challenging to diagnose. As some interconnects fail before other interconnects, a circuit may exhibit random errors that are indistinguishable from other failure mechanisms. In a laboratory setting, EM failure may be readily viewed with an electron microscope, as interconnect erosion leaves visual markers on metal layers of an IC. With increasing IC miniaturization the probability of IC failure due to EM increases, as both power density and current density increase as IC size decreases. In advanced semiconductor manufacturing processes, copper has replaced aluminum as the interconnect material of choice, as copper is intrinsically less susceptible to EM. In modern consumer electronic devices, ICs rarely fail due to EM effects, because proper semiconductor design practices incorporate the effects of EM into the IC layouts. That is, nearly all IC design houses use automated electronic design automation (EDA) tools to detect and correct EM problems at the transistor layout-level.

In general, the "Blech length" has been used to denote a length limit for an interconnect below which EM will not occur at a given current density. That is, any interconnect whose length is below the "Blech length" will not typically fail due to EM at lower current densities, but may fail at higher current densities. In general, an interconnect whose length is below the "Blech length" experiences a mechanical stress build-up that causes a reverse migration process that reduces or even compensates for material flow.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
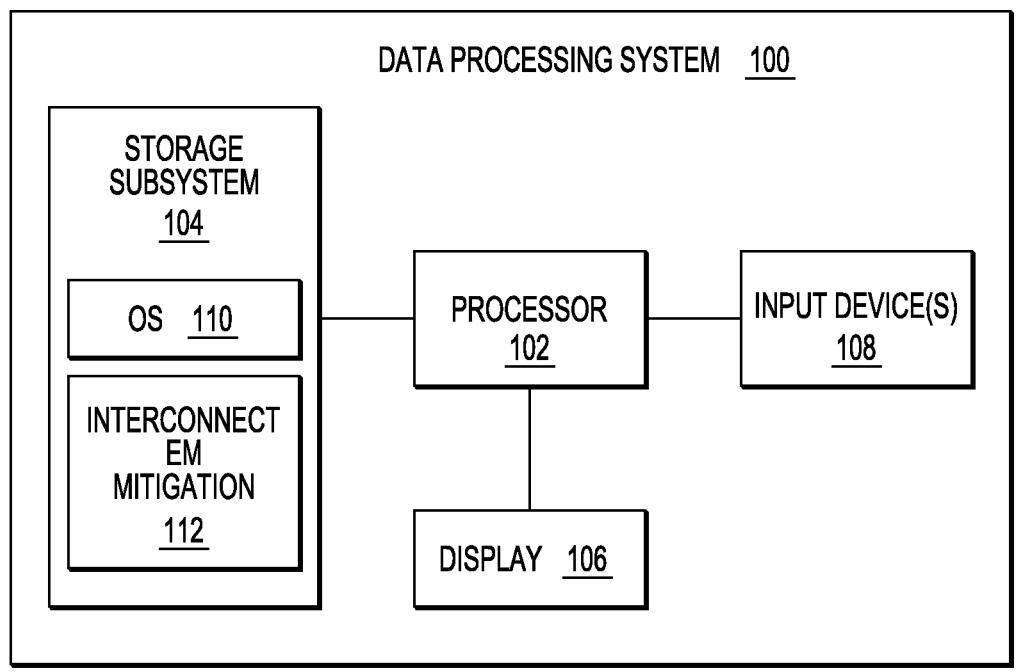
FIG. 1 is a diagram of a relevant portion of an exemplary data processing system that performs electromigration (EM) stress mitigation for interconnects of an integrated circuit (IC) design according to an embodiment of the present invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' may encompass a direct electrical connection between elements or components and an indirect electrical connection between elements or components achieved using one or more intervening elements or components.

Using the "Blech length" to determine a length limit for an interconnect of an integrated circuit (IC) may result in over-design of IC interconnects. In general, the Blech length for an interconnect has been determined using ideal, straight-line, uniform width test structures. However, interconnect shapes typically found in ICs may have bends, turns, forks, and varying width, thus introducing substantial deviations from the ideal case. According to the present disclosure, techniques are disclosed that solve for stresses in IC interconnects that arise as a result of current flowing through the interconnects. The stresses are then compared to electromigration (EM) design rules to check for EM risk. In general, the techniques consider current direction to determine maximum stress in interconnect segments for EM checks.

For example, maximum interconnect stress can be evaluated through inspection of an interconnect directed graph. According to various aspects, an interconnect directed graph is constructed following identification of current direction in all interconnect segments of a net. For example, current direction may be retrieved from a simulation program with integrated circuit emphasis (SPICE) simulation file. A maximum stress on an interconnect may then be calculated by comparing the maximum stress to a critical stress (e.g., determined by the Blech length and a maximum allowed current). In the event a maximum stress exceeds a critical stress, one or more stubs may be added to an IC design in an attempt to mitigate EM. It should be appreciated that an area and a location of an added stub may be varied in an attempt to lower a maximum stress below a critical stress.

In general, the disclosed techniques are primarily targeted at providing a solution to determine a critical stress that determines a critical length for applying the Blech effect, which is applicable to interconnect widths less than a certain width, e.g., about 3 microns. Accordingly, the disclosed techniques provide a straight-forward solution for determining a maximum stress of an arbitrary interconnect, which generally leads to a more accurate determination of EM risk and, in turn, higher quality products. Moreover, a stub of an appropriate area may be added at an appropriate location in an IC design to mitigate EM.

The Blech effect allows shorter interconnects to carry larger currents than longer interconnects. As one example, in a metal 1 (M1) layer for a 55 nanometer design, current densities based on length 'L' may be as follows: an interconnect with 'L' less than or equal to Sum can carry 4 mA current density; an interconnect with 'L' greater than Sum and less than 20 um can carry 20/L mA current density; and an interconnect with 'L' greater than or equal to 20 um can carry 1 mA current density. In order to calculate current limits, 'L' must first be calculated. As alluded to above, conventional length calculation in computer-aided design (CAD) tools is pessimistic and can result in larger designs and IC quality issues. Conventionally, an accurate determination of current limits has required solving the full equations for stress/strain relation, mass conservation, and stress source from electron current. In general, solving the full equations is complex and time-consuming and, as such, the Blech length has traditionally been defined to be the maximum spanning length of all interconnect branches in a net. As such, the Blech length is a conservative approximation for determining current limits of each interconnect segment.

With reference to FIG. 1, an example data processing system 100 is illustrated that is configured to execute various electronic design automation (EDA) software. The system 100 may take various forms, such as one or more workstations, laptop computer systems, notebook computer systems, or desktop computer systems. The system 100 includes a processor 102 (which may include one or more processor cores for executing program code) coupled to a data storage subsystem 104, a display 106, and one or more input devices 108. The data storage subsystem 104 may include, for example, an application appropriate amount of volatile memory (e.g., dynamic random access memory (DRAM)), non-volatile memory (e.g., flash, read-only memory (ROM), or static RAM), and/or non-volatile mass storage devices, such as magnetic or optical disk drives. As is illustrated, the data storage subsystem 104 includes an operating system (OS) 110, as well as application programs, such as interconnect electromigration (EM) mitigation software 112. Display 106 may be, for example, a cathode ray tube (CRT) or a liquid crystal display (LCD) monitor. Input device(s) 108 may include, for example, a mouse, a keyboard, haptic devices, and/or a touch screen.

According to the present disclosure, current direction is utilized to determine maximum stress in interconnect segments for EM checks. According to one aspect of the present disclosure, a maximum stress is evaluated through inspection of an interconnect directed graph. According to this aspect, current direction is identified in all interconnect segments of a net and a directed graph is constructed. Maximum stress on an interconnect is then calculated. The maximum stress is then compared to a critical stress determined by the Blech length and the maximum allowed current. If the maximum stress on an IC interconnect exceeds the critical stress a process may be initiated that adds different area stubs at different locations along the failing interconnect in an attempt to mitigate EM, as indicated by the added stub causing the maximum stress to be lowered below the critical stress. In some embodiments of the present invention, the stub may be added at a location that is not at the maximum stress, but still leads to lowering the maximum stress below the critical stress.

Figures 2, 3:
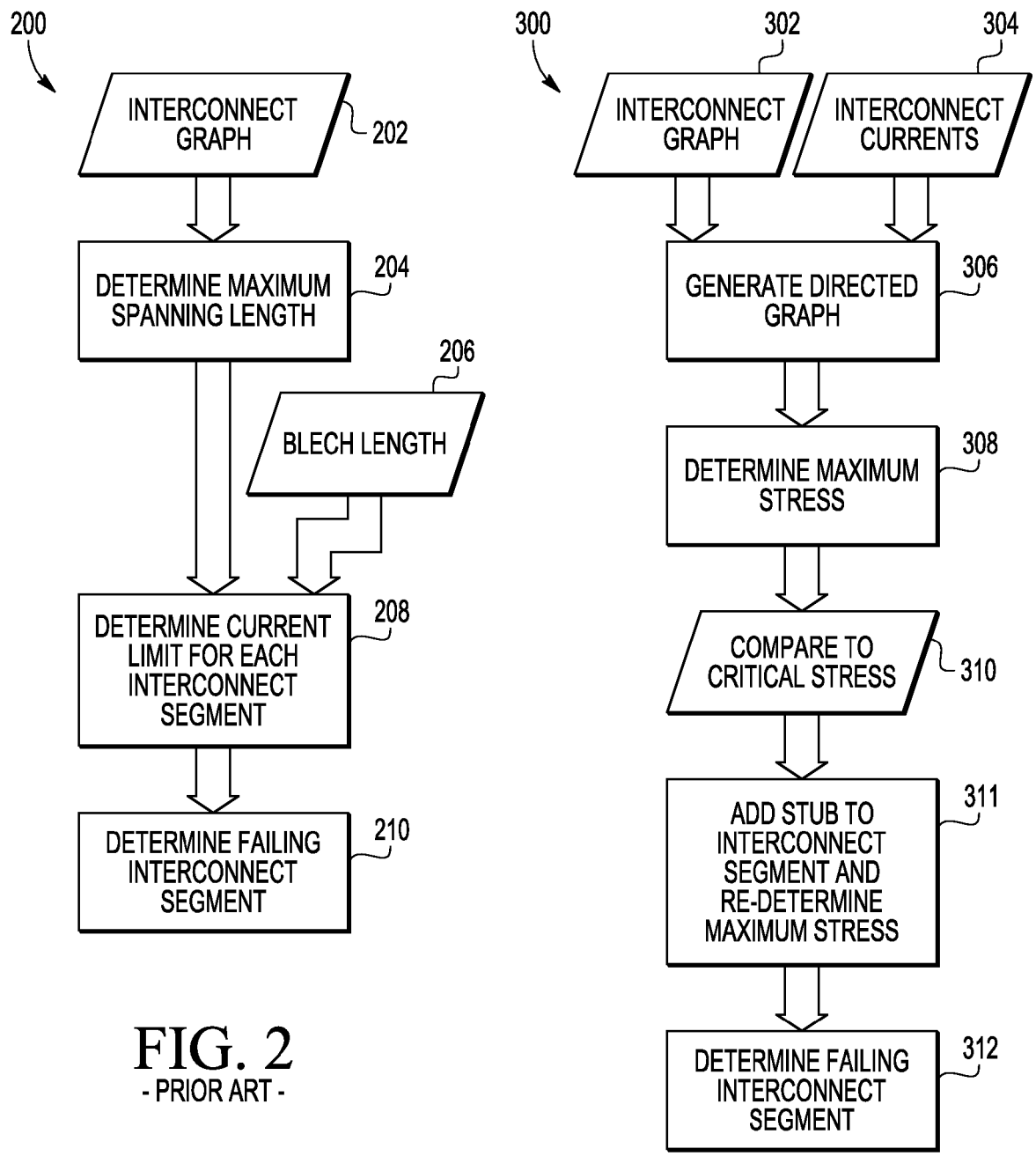
FIG. 2 is a diagram of a conventional approach for verifying that an IC design does not have EM problems based on the Blech length.
FIG. 3 is a diagram of a technique for adding a stub and verifying that an IC design does not have EM problems according to one or more embodiments of the present invention.

With reference to FIG. 2, a conventional process 200 for checking an integrated circuit (IC) design (or a portion of an IC design) is illustrated. As is shown in FIG. 2, a maximum spanning length 204 for an interconnect is determined from an interconnect graph 202. A Blech length 206, which is known for a given technology, is compared to the maximum spanning length 204. An appropriate current limit equation is then chosen based on the comparison. Current limits for each interconnect segment are then determined in block 208. Finally, failing interconnect segments are determined in block 210, based on whether the maximum spanning length 204 is greater than the Blech length 206.

With reference to FIG. 3, a process 300, for mitigating EM stress in interconnects of an IC design, according to the present disclosure, is illustrated. An interconnect graph 302 and interconnect currents 304 are utilized to generate a directed graph in block 306. For example, a direction of the interconnect currents 304 may be retrieved from a SPICE file. A maximum stress for the directed graph is then determined in block 308, as is discussed in further detail below. The maximum stress is then compared to a critical stress in block 310. In the event that the maximum stress is greater than the critical stress, one or more stubs may be iteratively added to the directed graph in an attempt to lower the maximum stress below the critical stress in block 311. It should be appreciated that an area and a location of a stub may be varied in an attempt to mitigate EM. Finally, a determination is made as to whether the directed graph still has a failing interconnect segment following EM stress mitigation in block 312.

Figure 4:
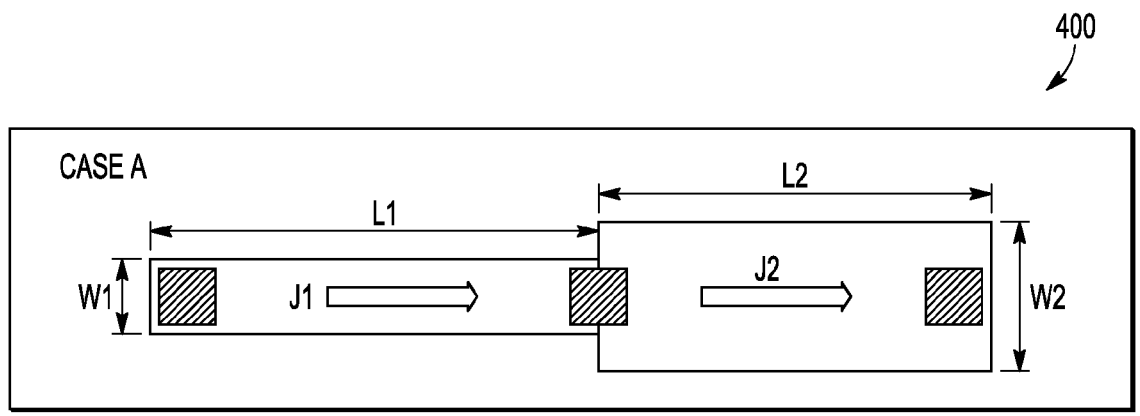
FIG. 4 is a diagram of a typical IC interconnect carrying currents (represented by current densities J1 and J2) in a same direction.
Figure 5:
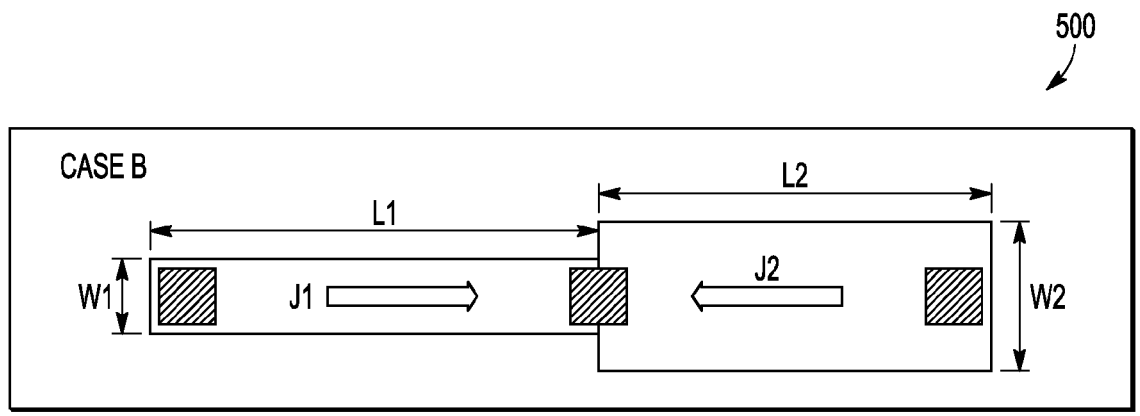
FIG. 5 is a diagram of a typical IC interconnect with currents (represented by current densities J1 and J2) in opposite directions.

With reference to FIGS. 4 and 5, using the conventional approaches, a Blech length for interconnect 400 (labeled 'Case A') and interconnect 500 (labeled 'Case B') has been defined as L=L1+L2, even though a current (represented by current density J2) flows through the interconnects 400 and 500 in opposite directions. According to the present disclosure, fundamental equations for stress caused by electron current density J, stress-strain relation, and mass conservation at each node 'i' of an interconnect are utilized to determine interconnect stress. In general, stress is confined to a given metal layer due to metal barriers. Stress caused by electron current density 'J' may be represented by:

$$\frac{\partial \sigma}{\partial x} = cj$$

where 'c' is a material-dependent constant given by:

$$c = \frac{Z^* e \rho}{\Omega}$$

where '$Z^*$' is the effective electron density, 'e' is the electron charge, '$\rho$' is the resistivity, and '$\Omega$' is the effective atomic volume. The displacement (stress-strain relation) is given by:

$$\frac{\partial u}{\partial x} = \frac{1}{M}\sigma$$

where 'M' is Young's modulus and 'u' is the strain. Mass conservation at each node 'i' is given by:

$$\sum_{e \in \{j\}} u_{ije} w_e$$

where $u_{ije}$ is the displacement at the 'jth' node on a segment 'e' between nodes 'i' and 'j' and $w_e$ is the width of segment 'e'. It should be appreciated that a segment may correspond to a portion of a metal layer or may correspond to a passive element (e.g., a resistor, a capacitor, or an inductor).

Figure 6:
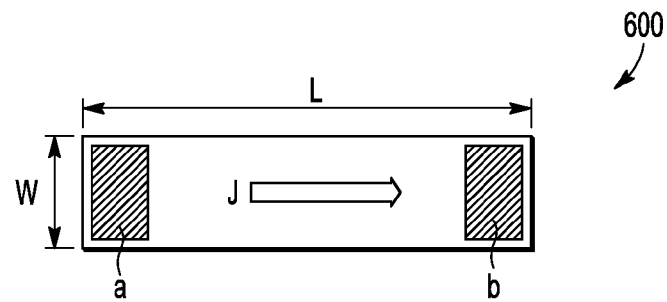
FIG. 6 is a diagram of a typical IC interconnect test structure utilized to determine critical stress and whether an IC interconnect will exhibit EM problems.

With reference to FIG. 6, a typical test structure 600 that may be utilized for determining critical stress is illustrated. Stress at nodes 'a' and 'b' may be given by:

$$\sigma_a = -\frac{c}{2}J \times L \implies \sigma_a = -\frac{c}{2}\frac{v \times a}{a} \qquad a = W \times L$$

$$\sigma_b = +\frac{c}{2}J \times L \implies \sigma_b = +\frac{c}{2}\frac{v \times a}{a} \qquad v = J \times L$$

where 'v' is proportional to the potential and 'a' is the area. If the stress at a node 'a' is greater than the critical strength of the interconnect, then a failure will occur (i.e., if $\sigma_a > \sigma^*$, a failure will occur).

Figure 7:
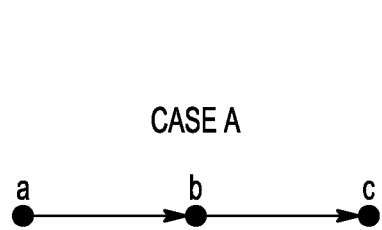
FIG. 7 is a diagram illustrating directed graphs for an exemplary IC interconnect with currents in a same direction in Case A and in opposite directions in Case B.
Figure 7:
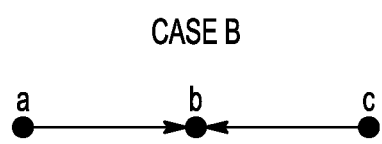

With reference to FIG. 7 directed graphs 700 (labeled 'Case A' and 'Case B') illustrate current flowing through an interconnect including nodes 'a', 'b', and 'c'. In Case A, current flows from node 'a' to node 'b' and from node 'b' to node 'c'. In contrast, in Case B, current flows from node 'a' to node 'b' and from node 'c' to node 'b'. Equations for the stress at nodes 'a', 'b', and 'c' for Case A and Case B are set forth below:

$$\sigma_{Aa} = -\frac{c}{2}\frac{v_1 a_1 + v_2 a_2 + 2v_1 a_2}{a_1 + a_2} \qquad \sigma_{Ba} = -\frac{c}{2}\frac{v_1 a_1 - v_2 a_2 + 2v_1 a_2}{a_1 + a_2}$$

$$\sigma_{Ab} = \frac{c}{2}\frac{v_1 a_1 - v_2 a_2}{a_1 + a_2} \qquad \sigma_{Bb} = \frac{c}{2}\frac{v_1 a_1 + v_2 a_2}{a_1 + a_2}$$

$$\sigma_{Ac} = +\frac{c}{2}\frac{v_1 a_1 + v_2 a_2 + 2v_2 a_1}{a_1 + a_2} \qquad \sigma_{Bc} = +\frac{c}{2}\frac{v_1 a_1 - v_2 a_2 - 2v_2 a_1}{a_1 + a_2}$$

From the above equations, it should be appreciated that the following two inequalities always hold:

$$|\sigma_{Aa}| \geq |\sigma_{Ba}| \quad |\sigma_{Aa}| \geq \sigma_{Bc}|$$

As such, Case B will always have less tensile stress than Case A and, consequently, less EM risk.

Figure 8:
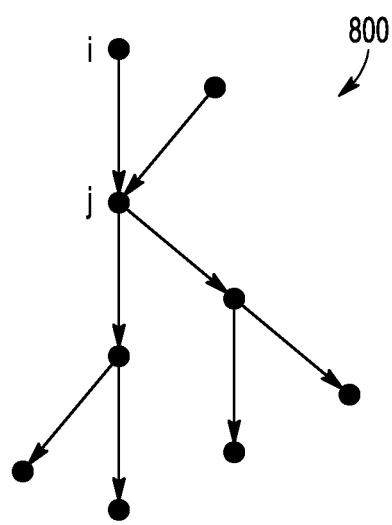
FIG. 8 is a diagram illustrating an exemplary directed graph for an exemplary IC interconnect.

With reference to FIG. 8, it should be appreciated that any interconnect network 800 of an IC can be represented by a directed graph 'G', with each edge of the graph 'G' having a weight $c*J*L$ and a direction that is the same as the current. The stress differential from node 'i' to node 'j' may be represented by the following equations:

$$\Delta\sigma_{ij} = c \times J_{ij} \times L_{ij} \implies \Delta\sigma_{ij} = \frac{c}{R_{sh}} \times I_{ij} \times R_{ij} \implies \Delta\sigma_{ij} = \frac{c}{R_{sh}} \times \Delta V_{ij}$$

where 'c' is a material-dependent constant, $J_{ij}$ is the current density from node 'i' to node 'j', $L_{ij}$ is the physical length from node 'i' to node 'j', $R_{Sh}$ is the sheet resistance, $I_{ij}$ is the current from node 'i' to node 'j', $R_{ij}$ is the resistance from node 'i' to node 'j', and $V_{ij}$ is the potential from node 'i' to node 'j'. As stress differential is proportional to potential difference, maximum stress occurs at the highest potential on the interconnect.

The stress at any node j ($\sigma_j$) may be given by:

$$\sigma_j = -\frac{c}{2} \times \frac{\sum_{i=1}^{N}\left(a_{T_i} \times \sum_{k \in P_{i,j}}(J_{k,k+1} \times L_{k,k+1})\right)}{A}$$

where 'N' is the total number of nodes in 'G' and $P_{ij}$ is the path from node 'i' to node 'j'. The stress at any node 'j' written in terms of potential difference between 'i' and 'j' may be given by:

$$\sigma_j = -\frac{c}{2R_{sh}} \times \frac{\sum_{\substack{i=1 \\ i \neq j}}^{N}(a_{T_i} \times \Delta V_{ij})}{A}$$

where 'A' is the area. The partial interconnect area at node 'i' may be given by:

$$a_{T_i} = \sum_{n \in \{N_i\}} a_n$$

where 'n' is the branch index connected to node 'i'. The total interconnect area may be given by:

$$A = \sum_{n \in \{G\}} a_n$$

where 'n' is the branch index over the whole of the graph 'G'. From the above, it follows that:

$$\sum_{\substack{i=1 \\ i \neq j}}^{N} a_{T_i} = 2A - a_{T_j} < 2A$$

Assuming all nodes are at the lowest potential (except the highest node) yields an upper limit of maximum stress of:

$$\sigma_{m,ul} = -\frac{c}{2R_{sh}} \times \Delta V_{max} \times \frac{\sum_{i=1}^{N} a_{T_i}}{A} > -\frac{c \times \Delta V_{max}}{R_{sh}}$$

$$\lambda = \frac{\sigma_{m,ul}}{\sigma^*} = \frac{2 \times \Delta V_{max}}{R_{sh} \times J^* \times L^*}$$

According to one aspect of the present disclosure, an interconnect solution can be found as follows: find a maximal spanning tree 'T' of 'G'; find the highest stress 'H' and lowest stress 'L' on 'T' (stress is lowest at highest potential at 'L' and stress is highest at lowest potential at 'H'); find any path P between 'H' and 'L'; calculate λ: if λ<1 then exit; otherwise calculate β; if β<1 then exit; if β>1, show an error on edge connected to the node and repeat for the next node in lower potential. In this case the stress is given by:

$$\sigma_L = \sigma_H - c \times \sum_{\alpha \in P} J_\alpha \times L_\alpha$$

λ is given by:

$$\lambda = -\frac{2 \times \Delta V_{max}}{R_{sh} \times J^* \times L^*}$$

and β is given by:

$$\beta_j = \frac{\sum_{i=1}^{N}(a_{T_i} \times \Delta V_{ij})}{R_{sh} \times J^* \times L^* \times A}$$

Figure 9:
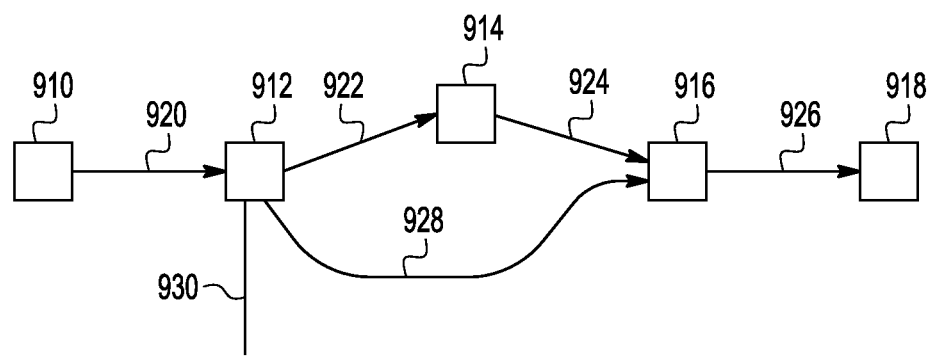
FIG. 9 is a diagram of an exemplary directed graph that represents an interconnect modified with a stub, according to one or more embodiments of the present invention.
Figure 10:
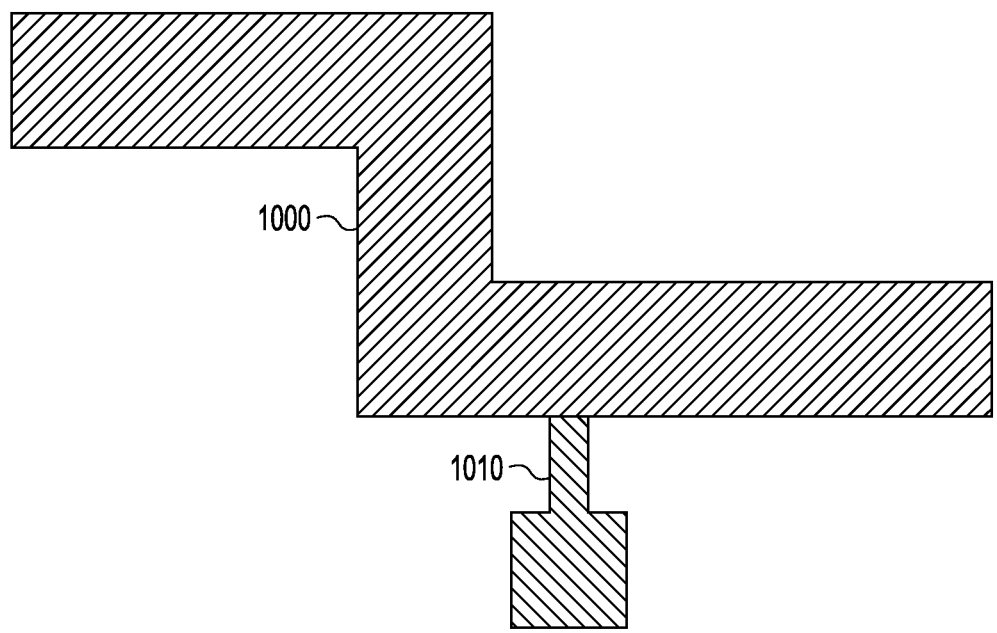
FIG. 10 illustrates an exemplary interconnect segment modified with a stub added to mitigate EM, according to one or more embodiments of the present invention.

A technique for modifying an interconnect segment that fails may include adding a stub along the failing interconnect segment. With reference to FIG. 9, a directed graph 900 for an interconnect is illustrated. The directed graph includes five nodes (i.e., nodes 910, 912, 914, 916, and 918), which may, for example, correspond to vias. Nodes 910 and 912 are connected by edge (segment) 920. Nodes 912 and 914 are connected by edge 922 and nodes 912 and 916 are connected by edge 928. Nodes 914 and 916 are connected by edge 924. Nodes 916 and 918 are connected by edge 926. As is illustrated, a stub 930 is added at node 912 in an attempt to mitigate EM (i.e., to reduce EM stress). With reference to FIG. 10, an exemplary failing interconnect segment 1000 is illustrated with an added stub 1010. Determining that an interconnect segment fails may include evaluating the inequality equation:

$$V_D - V_i \leq \frac{1}{2}\Delta V_C$$

to determine whether the equation can or cannot be satisfied. In the above equation $V_D$ is an average distributed potential of a segment, $V_i$ is a potential of an ith node, and $\Delta V_C$ is a critical potential difference. As one example, electrical characteristics of an interconnect can be changed by adding a stub to produce a different value for $V_i$ and/or $V_D$ such that the above inequality equation can be satisfied.

In one or more embodiments, a stub can be added to an interconnect segment such that the interconnect segment produces a different distributed potential $V'_D$ given by:

$$V'_D = V_S \frac{a_S}{A + a_S} + \frac{1}{2}\sum_{k \in B} V_k \frac{a_S}{A + a_S}$$

where B is a set of all nodes of a segment of the interconnect, $V_k$ is a potential at node 'k', 'A' is an area of the segment of the interconnect, $a_S$ is an area of a stub, and $V_S$ is a potential of the stub. The different distributed potential $V'_D$ may also be given by:

$$V'_D = V_S \frac{a_S}{A + a_S} + \frac{1}{2}\sum_{k \in B} V_k \frac{a_S}{A + a_S}$$

$$= V_S \frac{a_S}{A + a_S} + \frac{1}{2}\frac{A}{A + a_S}\sum_{k \in B} V_k \frac{a_k}{A}$$

$$= V_S \frac{a_S}{A + a_S} + V_D \frac{A}{A + a_S}$$

A stub area $a_S$ can be given by:

$$a_S = A\frac{V'_D - V_D}{V_S - V'_D}$$

For example, modifying an interconnect segment with a stub can cause the inequality equation to be satisfied and correspondingly the interconnect segment to pass an EM stress evaluation and/or examination.

It should be appreciated that stress is proportional to node potential difference. For example, stress on node 'i' may be given by:

$$\sigma_i = \frac{Z^*e}{\Omega}(V_D - V_i)$$

A technique for determining a placement of a stub may include examining one or more areas surrounding an interconnect segment. For example, one or more devices (e.g., semiconductor devices, resistors, capacitors, inductors, etc.) that are proximate to the interconnect segment may bound one or more areas surrounding the interconnect segment. In general, examining an area surrounding the interconnect segment can include determining one or more boundaries of one or more areas that are candidates for a stub. For example, an area of the one or more areas surrounding the interconnect segment that is a candidate for a stub is greater than the area of the stub (e.g., $a_S$ as calculated above), while still meeting design rules with respect to spacing.

In general, an area of the one or more areas surrounding the interconnect segment that is suitable for a stub can be based on a possible effect of the stub on the interconnect segment. For example, a stub may alter a capacitance of an interconnect segment and an area of the one or more areas surrounding the interconnect segment that is suitable for a stub may be based on minimizing a change in coupling capacitance resulting from placement of the stub. In one or more embodiments, determining the area of the one or more areas surrounding the interconnect segment that is suitable for the stub can include receiving user input. For example, the user input can indicate the area from possible multiple areas available for placement of the stub. A stub may then be coupled to an interconnect segment such that the stub is included in the area of the one or more areas surrounding the interconnect segment that is determined to be suitable for the stub.

Figure 11:
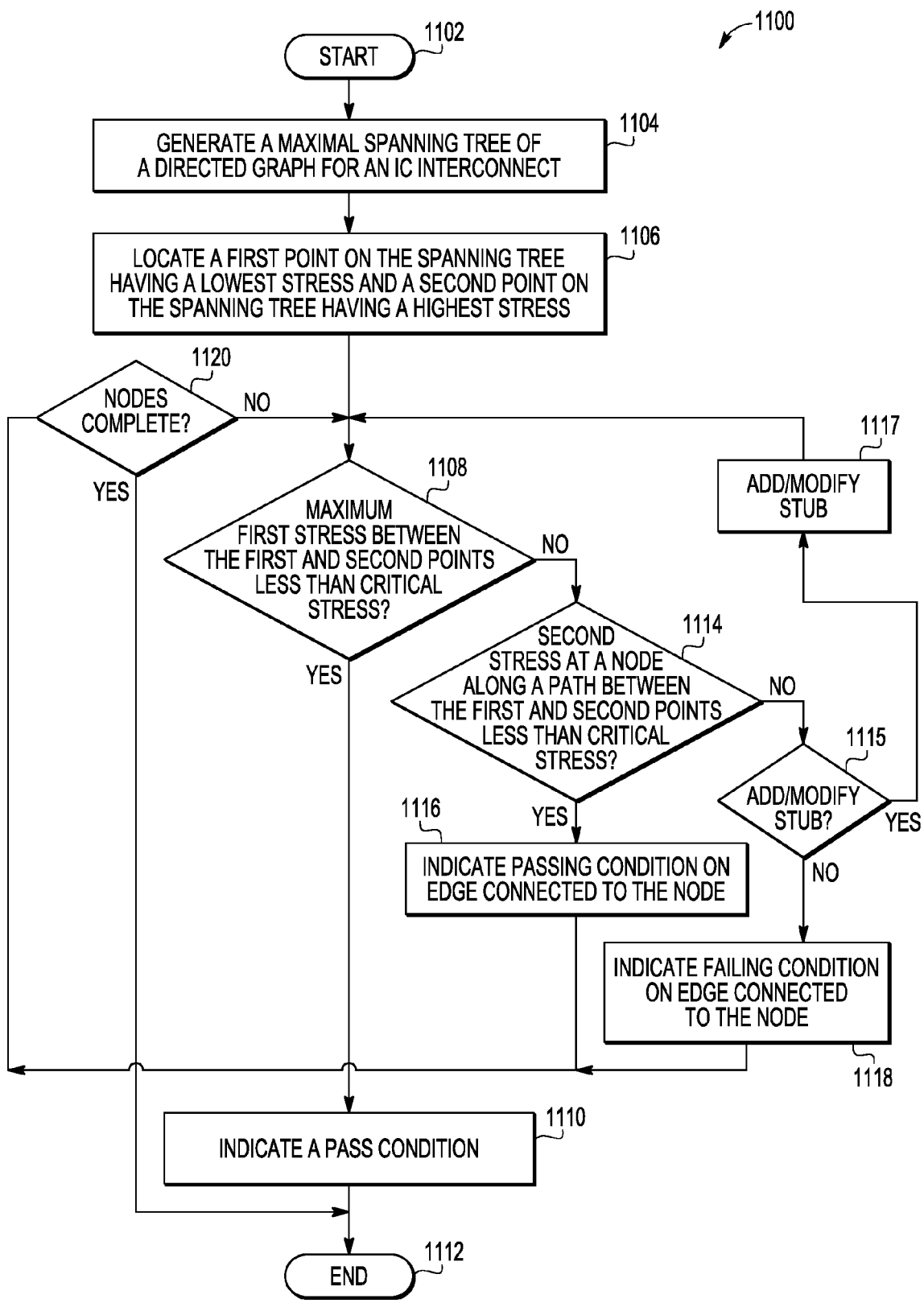
FIG. 11 is a flowchart for an exemplary process that attempts to mitigate potential EM problems for an IC interconnect, by adding one or more stubs, that is represented as a directed graph according to an embodiment of the present invention.

With reference to FIG. 11, an exemplary process 1100 is illustrated that determines stress in interconnects of an integrated circuit (IC) design and attempts to mitigate the EM stress by adding an appropriate sized stub in an appropriate location, according to the present disclosure. The process 1100 may be implemented by data processing system 100 executing interconnect EM mitigation software 112 (see FIG. 1) that employs one or more of the equations disclosed above. The process 1100 is initiated in block 1102, at which point control transfers to block 1104. In block 1104, the system 100 generates a maximal spanning tree 'T' of a directed graph 'G' that represents an interconnect of interest in an IC design. Next, in block 1106, the system 100 locates a first point on the spanning tree that has a lowest stress and a second point on the spanning tree that has a highest stress. Then, in decision block 1108, the system 100 determines whether a maximum first stress between the first and second points is less than a critical stress. In response to the maximum first stress being less than the critical stress in block 1108, control transfers to block 1110 where the system 100 indicates a pass condition in response to the maximum first stress being less than the critical stress. In block 1110, the system may also store a modified interconnect network for the integrated circuit design (or create at least a portion of a mask set for the integrated circuit design that includes the interconnect network with the added/modified stub) in response to the maximum first stress between the first and second points being less than the critical stress subsequent to adding/modifying a stub in block 1117. Following block 1110, the process 1100 terminates in block 1112, at which point control returns to a calling routine.

In response to the maximum first stress being greater than or equal to the critical stress in block 1108, control transfers to decision block 1114. In block 1114, the data processing system 100 determines whether a second stress at a node along a path between the first and second points is less than the critical stress. In response to the second stress at the node along the path between the first and second points being less than the critical stress control transfers from block 1114 to block 1116. In block 1116, the data processing system 100 indicates a pass condition on an edge connected to the node. Following block 1116, control transfers to decision block 1120, where the data processing system 100 determines if another node exists between the first and second points.

If another node exists in block 1120, control transfers to block 1108. If another node does not exist in block 1120, control transfers to block 1112. In response to the second stress at the node along the path between the first and second points being greater than or equal to the critical stress in block 1114, control transfers to decision block 1115. In block 1115, data processing system 100 determines whether a stub may be added to the IC interconnect or a stub may be modified. For example, data processing system 100 may examine candidate areas around a failing node to determine whether a stub can be added near the failing node without causing other IC design rules (e.g., spacing between metal traces) to be violated or whether adding a stub or stubs to all areas around the failing node have been attempted without resulting in reducing a stress at the failing node below a critical stress. In response to determining a stub may be added/modified in block 1115, control transfers to block 1117 where a new stub is added or an existing stub is modified. From block 1117 control returns to block 1108. In response to determining a stub may not be added or modified in block 1115, control transfers to block 1118. In block 1118, the data processing system 100 indicates a failing condition on the edge connected to the node. Following block 1118, control transfers to block 1120.

Accordingly, techniques have been disclosed herein that add stubs to an integrated circuit (IC) interconnect in an attempt to reduce stress and associated electromigration in the IC interconnect.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in various embodiments of the present invention may be implemented using any combination of software, firmware or hardware. As a preparatory step to practicing the invention in software, code (whether software or firmware) according to a preferred embodiment will typically be stored in one or more machine readable storage mediums such as semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:
1. A method of electromigration stress mitigation in interconnects of an integrated circuit design, comprising:

generating, using a data processing system, a maximal spanning tree of a directed graph, wherein the directed graph represents an interconnect network of an integrated circuit design;
locating, using the data processing system, a first point on the spanning tree having a lowest stress and a second point on the spanning tree having a highest stress;
determining, using the data processing system, a maximum first stress between the first and second points;
in response to determining the maximum first stress between the first and second points is greater than a critical stress, adding, using the data processing system, a stub to the spanning tree at a node between the first and second points;
re-determining, using the data processing system, the maximum first stress between the first and second points subsequent to adding the stub; and
in response to the maximum first stress between the first and second points being less than the critical stress subsequent to adding the stub, storing, using the data processing system, the interconnect network for the integrated circuit design.

2. The method of claim 1, further comprising:
indicating, using the data processing system, a pass condition in response to the re-determined maximum first stress being less than the critical stress.

3. The method of claim 1, further comprising:
determining, using the data processing system, whether a second stress at a node along a path between the first and second points is less than the critical stress in response to the re-determined maximum first stress being greater than or equal to the critical stress; and
indicating, using the data processing system, in response to the second stress at the node along the path between the first and second points being less than the critical stress, a passing condition on an edge connected to the node.

4. The method of claim 1, further comprising:
adjusting the stub in response to the re-determined maximum first stress being greater than or equal to the critical stress;
re-determining, using the data processing system, the maximum first stress between the first and second points subsequent to adjusting the stub;
determining, using the data processing system, whether a second stress at a node along a path between the first and second points is less than the critical stress in response to the re-determined maximum first stress being greater than or equal to the critical stress subsequent to adjusting the stub;
indicating, using the data processing system, in response to the second stress at the node along the path between the first and second points being less than the critical stress subsequent to adjusting the stub, a passing condition on an edge connected to the node; and
indicating, using the data processing system, in response to the second stress at the node along the path between the first and second points being greater than or equal to the critical stress subsequent to adjusting the stub a predetermined number of times, a failing condition on the edge connected to the node.

5. The method of claim 1, wherein the lowest stress occurs at a highest potential and the highest stress occurs at a lowest potential.

6. The method of claim 1, wherein the interconnect network includes one or more metal segments.

7. The method of claim 6, wherein the interconnect network also includes one or more passive components.

8. A data processing system configured to mitigate electromigration stress in interconnects of an integrated circuit design, the data processing system comprising:
a storage subsystem; and
a processor coupled to the storage subsystem, wherein the processor is configured to:
create a maximal spanning tree of a directed graph that represents an interconnect network of an integrated circuit design;
find a first point on the spanning tree having a lowest stress and a second point on the spanning tree having a highest stress;
ascertain a maximum first stress between the first and second points;
in response to ascertaining the maximum first stress between the first and second points is greater than a critical stress, add a stub to the spanning tree at a node between the first and second points;
re-ascertain the maximum first stress between the first and second points subsequent to adding the stub; and
in response to the maximum first stress between the first and second points being less than the critical stress subsequent to adding the stub, create at least a portion of a mask set for the integrated circuit design that includes the interconnect network with the added stub.

9. The data processing system of claim 8, wherein the processor is further configured to indicate a pass condition in response to the re-ascertained maximum first stress being less than the critical stress.

10. The data processing system of claim 8, wherein the processor is further configured to:
determine whether a second stress at a node along a path between the first and second points is less than the critical stress in response to the re-determined maximum first stress being greater than or equal to the critical stress; and
indicate a passing condition on an edge connected to the node in response to the second stress at the node along the path between the first and second points being less than the critical stress.

11. The data processing system of claim 8, wherein the processor is further configured to:
adjust the stub in response to the re-ascertained maximum first stress being greater than or equal to the critical stress;
re-determine the maximum first stress between the first and second points subsequent to adjusting the stub;
determine whether a second stress at a node along a path between the first and second points is less than the critical stress in response to the re-determined maximum first stress being greater than or equal to the critical stress subsequent to adjusting the stub;
indicate a passing condition on an edge connected to the node in response to the second stress at the node along the path between the first and second points being less than the critical stress subsequent to adjusting the stub; and
indicate a failing condition on the edge connected to the node in response to the second stress at the node along the path between the first and second points being greater than or equal to the critical stress subsequent to adjusting the stub a predetermined number of times.

12. The data processing system of claim 8, wherein the lowest stress occurs at a highest potential and the highest stress occurs at a lowest potential.

13. The data processing system of claim 8, wherein the interconnect network includes one or more passive components.

14. The data processing system of claim 13, wherein the interconnect network also includes one or more metal segments.

15. A method of mitigating electromigration stress in interconnects of an integrated circuit design, comprising:
generating, using a data processing system, a maximal spanning tree of a directed graph, wherein the directed graph represents an interconnect network of an integrated circuit design;
locating, using the data processing system, a first point on the spanning tree having a lowest stress and a second point on the spanning tree having a highest stress;
determining, using the data processing system, whether a maximum first stress between the first and second points is less than a critical stress;
in response to determining the maximum first stress between the first and second points is greater than a critical stress, adding, using the data processing system, a stub to the spanning tree at a node between the first and second points;
re-determining, using the data processing system, the maximum first stress between the first and second points subsequent to adding the stub;
indicating, using the data processing system, a pass condition in response to the maximum first stress being less than the critical stress; and
in response to the maximum first stress between the first and second points being less than the critical stress subsequent to adding the stub, generating, using the data processing system, at least a portion of a mask set for the integrated circuit design that includes the interconnect network with the added stub.

16. The method of claim 15, further comprising:
determining, using the data processing system, whether a second stress at a node along a path between the first and second points is less than the critical stress in response to the re-determined maximum first stress being greater than or equal to the critical stress; and
indicating, using the data processing system, in response to the second stress at the node along the path between the first and second points being less than the critical stress, a passing condition on an edge connected to the node.

17. The method of claim 15, further comprising:
adjusting the stub in response to the re-determined maximum first stress being greater than or equal to the critical stress;
re-determining, using the data processing system, the maximum first stress between the first and second points subsequent to adjusting the stub;
determining, using the data processing system, whether a second stress at a node along a path between the first and second points is less than the critical stress in response to the re-determined maximum first stress being greater than or equal to the critical stress subsequent to adjusting the stub;
indicating, using the data processing system, in response to the second stress at the node along the path between the first and second points being less than the critical stress subsequent to adjusting the stub, a passing condition on an edge connected to the node; and
indicating, using the data processing system, in response to the second stress at the node along the path between the first and second points being greater than or equal to the critical stress subsequent to adjusting the stub a predetermined number of times, a failing condition on the edge connected to the node.

18. The method of claim 15, wherein the lowest stress occurs at a highest potential and the highest stress occurs at a lowest potential.

19. The method of claim 15, wherein the interconnect network includes one or more metal segments.

20. The method of claim 15, wherein the interconnect network includes one or more passive components.

* * * * *